(12) United States Patent
Onda et al.

(10) Patent No.: US 8,740,287 B2
(45) Date of Patent: Jun. 3, 2014

(54) PASSENGER PROTECTION DEVICE FOR VEHICLE

(75) Inventors: Kazuhiro Onda, Wako (JP); Nobuhiro Kawamoto, Wako (JP); Itaru Genpei, Wako (JP); Makoto Uchikawa, Wako (JP); Takashi Kikuchi, Wako (JP); Hajime Ishida, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 1 day.

(21) Appl. No.: 13/265,392

(22) PCT Filed: Apr. 20, 2010

(86) PCT No.: PCT/JP2010/056999
§ 371 (c)(1),
(2), (4) Date: Oct. 20, 2011

(87) PCT Pub. No.: WO2010/122998
PCT Pub. Date: Oct. 28, 2010

(65) Prior Publication Data
US 2012/0038182 A1  Feb. 16, 2012

(30) Foreign Application Priority Data

Apr. 21, 2009  (JP) ................................. 2009-102903
Apr. 21, 2009  (JP) ................................. 2009-102920

(51) Int. Cl.
*B60N 2/00*  (2006.01)
*B62D 21/15*  (2006.01)

(52) U.S. Cl.
USPC ................................. 296/187.12; 296/193.06

(58) Field of Classification Search
USPC ...................... 296/187.12, 203.03, 193.06, 63
See application file for complete search history.

(56) References Cited

U.S. PATENT DOCUMENTS

| 5,110,176 A * | 5/1992 | Curtis ...................... 296/187.12 |
| 6,203,096 B1 | 3/2001 | Noda et al. |
| 7,413,240 B2 * | 8/2008 | Rashidy et al. .......... 296/187.12 |

FOREIGN PATENT DOCUMENTS

| JP | H03-64827 U | 6/1991 |
| JP | 9-071200 A | 3/1997 |
| JP | 11-151963 A | 6/1999 |
| JP | 11-334506 A | 12/1999 |
| JP | 2000-125988 A | 5/2000 |
| JP | 3546143 B2 | 7/2004 |
| JP | 2006-205767 A | 8/2006 |
| JP | 2009-006895 A | 1/2009 |

* cited by examiner

*Primary Examiner* — Glenn Dayoan
*Assistant Examiner* — Melissa A Black
(74) *Attorney, Agent, or Firm* — Carrier Blackman & Associates, P.C.; William D. Blackman; Joseph P. Carrier

(57) ABSTRACT

Disclosed is a passenger protection device (12) for a vehicle, which protects a passenger (Mn) sitting on a seat (11) when an external force (Fs) is applied to a side surface (16a) of a vehicle body (16). The passenger protection device has a side support (14). The side support is provided on the side portion of a seat back (46), and supports the upper body (Bu) of the passenger. The side support has a deformable portion (47). The deformable portion allows the side support to be deformed by an external force having a predetermined value or more.

20 Claims, 8 Drawing Sheets

PASSENGER PROTECTION DEVICE FOR VEHICLE

TECHNICAL FIELD

The present invention relates to passenger or vehicle occupant protection device which protects a passenger or vehicle occupant, seated in a seat, when impact force (external force) has acted on a side surface, in a width direction, of the vehicle, i.e. at the time of a so-called lateral collision of the vehicle.

BACKGROUND ART

Among the conventionally-known vehicle occupant protection devices constructed to protect a vehicle occupant when a lateral collision of the vehicle has occurred is one where a side support is provided on a side portion of a seat back of a seat. Such a type of vehicle occupant protection device is known from patent literature 1. In the vehicle occupant protection device known from patent literature 1, the side support protrudes forward from the side portion of the seat back. The side support has an energy absorbing pad provided therein. When subjected to external force, the side surface deforms toward the interior of a passenger compartment of the vehicle and hits the side support. By absorbing the external force by means of the energy absorbing pad, the known vehicle occupant protection device can protect the vehicle occupant seated in the seat.

In recent years, however, there has been a need to further enhance protection performance for protecting the vehicle occupant at the time of a lateral collision of the vehicle.

PRIOR ART LITERATURE

Patent literature 1: Japanese Patent No. 3546143

SUMMARY OF INVENTION

Technical Problem

It is therefore an object to provide a technique for further enhancing protection performance for protecting a vehicle occupant at the time of a lateral collision.

Solution to Problem

According to an aspect of the present invention, there is provided an improved passenger protection device for a vehicle including a door opening provided in a side surface of a vehicle body and openable and closable with a side door, a seat disposed in a passenger compartment near the door opening, the passenger protection device protecting a passenger, seated in the seat, when external force acts on the side surface of the vehicle body. The passenger protection device comprises a side support provided on a side portion of a seat back of the seat for supporting an upper half part of a body of the passenger. The side support is disposed along a rear portion of a peripheral edge defining the door opening, and the side support includes a deformation permitting portion which permits the side support to be deformed by the external force greater than a predetermined intensity.

Preferably, the deformation permitting portion is provided in at least a part of a reinforcing member integrally formed on the side support for reinforcing the side support, the deformation permitting portion having a smaller strength than a remaining part of the reinforcing member.

Preferably, the side support includes, on the part having the deformation permitting portion provided therein or near the part, a load lessening portion that is in the form of a foamed member or a hollow member.

Preferably, the passenger protection device of the present invention further comprises a load transmission portion provided in the side door, the load transmission portion being designed to be capable of transmitting the external force from the side door to the vehicle body, the deformation permitting portion being spaced from the load transmission portion in a front-rear direction or up-down direction of the vehicle.

Preferably, the passenger protection device of the present invention further comprises an impact absorbing member provided in the side door. As the vehicle is viewed from a side thereof, the impact absorbing member is disposed to overlap a door beam that is elongated in the front-rear direction for reinforcing the side door, the door beam being fixedly connected to the load transmission portion, and the deformation permitting portion is disposed to not interfere with the impact absorbing member that is moved toward the seat in response to deformation of the side door.

Preferably, the side support includes a stay fixed to one of the vehicle body and seat back frame for supporting the seat back on the vehicle body, the stay extending in a front-rear direction of the vehicle.

Preferably, the side support has a shape convexly curved toward a front of the vehicle.

Preferably, the passenger protection device of the present invention further comprises a cross member and a gusset portion mounted on the vehicle body. The cross member extends in a width direction of the vehicle and is disposed near the load transmission portion, the gusset portion is constructed to be capable of transmitting the external force from the load transmission portion to the cross member, and the deformation permitting portion is disposed above the gusset portion.

Preferably, the passenger protection device of the present invention further comprises a seat-side pad and a door-side pad, and the seat-side pad is formed of a material harder than a material of a seating surface of a seat cushion of the seat and provided in a side portion of the seat cushion. Further, the door-side pad is provided in the side door in such a manner that the external force can be transmitted from the side door to the seat-side pad, the door-side pad being disposed to overlap the seat-side pad as the vehicle is viewed from the side thereof.

Preferably, the passenger protection device of the present invention further comprises a load transmission portion provided in the side door in such a manner that the external force can be transmitted from the side door to the edge of the door opening. As the vehicle is viewed from the side thereof, the door-side pad is disposed to overlap the door beam elongated in the front-rear direction of the vehicle for reinforcing the side door, but to not overlap the load transmission portion.

Preferably, the material of the seat-side pad is softer than a material of the door-side pad.

Preferably, the door-side pad has a pressing surface capable of pressing a pressed surface of the seat-side pad, and at least one of the pressing surface and the pressed surface is formed as a guide surface capable of guiding the seat-side pad in a direction different from a transmitting direction of the external force by transmitting the external force from the pressing surface to the pressed surface.

Further, preferably, as the vehicle is viewed from the side thereof, the seat-side pad is disposed to not overlap a seat frame for supporting the seat cushion on the vehicle body.

Advantageous Effects of Invention

In the present invention, the side support of the seat is disposed along the rear portion of the peripheral edge defining the door opening provided in the side surface of the vehicle body, and it includes the deformation permitting portion. The deformation permitting portion allows the side support to be deformed by external force acting on the side surface of the vehicle body. Thus, when external force greater than a predetermined intensity has acted on the side surface, in the width direction, of the vehicle, i.e. when a so-called lateral collision has occurred, the side support itself deforms, so that the external force can be sufficiently absorbed. In this way, the present invention can enhance the performance for protecting a passenger or vehicle occupant seated in the seat.

Further, the deformation permitting portion is provided in at least the part of the reinforcing member integrally formed on the side support. Further, the deformation permitting portion is a fragile part having a smaller strength against external force than the remaining part of the reinforcing member. In a normal state where no external force is acting on the side port, the deformation permitting portion does not deform. Thus, the vehicular occupant in the seated position can be prevented from inclining toward the side door, by the side support maintaining its normal-state shape without deformation. Namely, the side support performs the vehicle occupant protection function. On the other hand, when great external force has acted on the side support from outside in the vehicle width direction, the deformation permitting portion deforms first, so that the side support deforms at appropriate timing, starting at the deformation permitting portion, to thereby absorb the external force; namely, the side support performs the vehicle occupant protection function. In this way, the present invention can perform both the vehicle occupant protection function during the normal state and the vehicle occupant protection function during an emergency.

Furthermore, the side support includes, on the part having the deformation permitting portion provided therein or near that part, the load lessening portion that is in the form of a foamed member or a hollow member. Thus, the side support, having been subjected to external force, starts to deform while simultaneously deforming the load lessening portion. Namely, in the present invention, a characteristic with which external force is absorbed by the side support, is a composite characteristic including a characteristic with which external force is absorbed by the load lessening portion. Thus, the composite characteristic, with which external force is absorbed by the side support and load lessening portion, can be optimally adjusted in advance by quality of material, shape and size of the foamed member or hollow member, constituting the load lessening portion, being set appropriately.

Furthermore, in the present invention, the deformation permitting portion is spaced, in the front-rear direction or up-down direction of the vehicle, from the load transmission portion that is capable of transmitting external force from the side door to the vehicle body. Thus, when the external force is transmitted from the side door to the vehicle body via the load transmission portion, the external force would be less likely to be transmitted directly to the deformation permitting portion. Thus, when the side door, having been subjected to the external force, and the vehicle body have deformed toward the interior of the passenger compartment, the deformation permitting portion can avoid being directly subjected to the external force, so that deformation of the side support can be restrained.

Further, in the present invention, the impact absorbing member is provided in the side door. When subjected to external force, a deformation amount of a portion of the side door reinforced by the door beam is significantly small as compared to the other portions of the side door. Further, the impact absorbing member is not only disposed to overlap the door beam but also fixedly connected to the door beam, and the impact absorbing member is displaced or moved toward the seat as the side door, having been subjected to the external force, deforms toward the interior of the passenger compartment. At that time, an amount of the deformation, toward the interior of the passenger compartment, of the impact absorbing member is small. Thus, the impact absorbing member can appropriately hold or constrain the seated vehicle occupant by relatively lightly contacting the vehicle occupant. Furthermore, the deformation permitting portion is disposed so as to not interfere with the impact absorbing member. Thus, when the impact absorbing member, having been subjected to the external force, has been displaced (moved) toward the sheet, the impact absorbing member and the deformation permitting portion do not influence each other. Thus, the impact absorbing member and the deformation permitting portion can sufficiently perform their respective functions.

Furthermore, in the present invention, the stay for fixing the side support to the vehicle body or seat back frame extends in the front-rear direction of the vehicle. Namely, the extending direction of the stay is generally orthogonal to a direction in which external force acts on the side surface of the vehicle. Thus, when the side door, having been subjected to external force, and the vehicle body deform toward the interior of the passenger compartment, the stay does not disturb the deformation of the side door and vehicle body. Thus, the external force acts on the side support in response to the deformation of the side door and vehicle body. The side support can absorb the external force by deforming at appropriate timing and in an appropriate manner.

Furthermore, in the present invention, the side support is convexly curved toward the front of the vehicle, and thus, the side support would easily deform when subjected to external force applied in the vehicle width direction.

Furthermore, the present invention further includes the cross member extending in the vehicle width direction and is located near the load transmission portion, and the gusset portion that transmits external force from the load transmission portion to the cross member. Thus, the side door, having deformed due to the external force toward the interior of the passenger compartment, can be caught by the cross member via the gusset portion. As a consequence, the present invention can reduce an amount of deformation of the side door. Further, the deformation permitting portion is located above the gusset portion, and thus, as the amount of deformation of the side door further increases, the external force acts on the side support by way of the side door. The side support can absorb the external force by deforming, from the deformation permitting portion on, at appropriate timing.

Further, the present invention includes the seat-side pad provided in the side portion of the seat cushion, and the door-side pad provided in the side door. The door-side pad is capable of transmitting external force from the side door to the seat-side pad, and, as the vehicle is viewed from the side, the door-side pad is disposed to overlap the seat-side pad. Thus, the external force having acted on the side door is transmitted from the door-side pad to the seat-side pad. Namely, the external force is transmitted to the seat cushion while being attenuated by the door-side pad and seat-side pad.

Further, the seat-side pad is formed of a material harder than the material of the seating surface of the seat cushion. Thus, the seat-side pad, having received external force, presses the side portion of the seat cushion toward the center of the vehicle width so that the seating surface is deformed upwardly. The thus upwardly-deformed seating surface can produce force that promptly constrains the seated vehicle occupant to thereby move the loins of the vehicle occupant toward the center of the passenger compartment.

The passenger protection device of the present invention further includes the load transmission portion provided in the side door in such a manner that external force can be transmitted from the side door to the edge of the door opening. As the vehicle is viewed from the side, the door-side pad is disposed to overlap the door beam, elongated in the front-rear direction of the vehicle for reinforcing the side door, but to not overlap the load transmission portion. Thus, the impact absorbing member and the deformation permitting portion do not influence each other. In this way, the impact absorbing member and the deformation permitting portion can sufficiently perform their respective functions.

Furthermore, in the present invention, the material of the seat-side pad is softer than the material of the door-side pad. Thus, as the door-side pad, having received external force, presses the seat-side pad, the seat-side pad deforms (collapses) by a great amount as compared to an amount of deformation (collapsing), in the vehicle width direction, of the door-side pad. Thus, as the side door, having received the external force, is displaced toward (i.e., gets closer to) the side portion, the seat-side pad absorbs the external force by collapsing by a great amount. Because the seat-side pad itself deforms greatly, it would not be displaced in such a manner as to greatly byte into the side portion of the seat cushion. As a consequence, the external force that is transmitted to the vehicle occupant seated in the seat, particularly the loins of the vehicle occupant, can be sufficiently absorbed before the side door is displaced greatly toward the side portion of the seat cushion.

Furthermore, in the present invention, at least one of the pressing surface and the pressed surface is formed as a guide surface capable of guiding the seat-side pad in a direction different from the transmitting direction of the external force by transmitting the external force from the pressing surface to the pressed surface. Thus, as the door-side pad, having received the external force, presses the pressed surface of the seat-side pad, the seat-side pad moves in a direction different from the transmitting direction of the external force, i.e., in the front-rear direction or up-down direction of the vehicle. As a result, the present invention can disperse the external force, transmitted from the seat-side pad to the side portion of the seat cushion, not only in the vehicle width direction but also in the front-rear direction or up-down direction of the vehicle.

As the vehicle is viewed from the side thereof, the seat-side pad is disposed to not overlap the seat frame for supporting the seat cushion on the vehicle body. Thus, external force acting on the seating surface from the seat-side pad would not be disturbed by the seat frame. As a consequence, the seating surface can be efficiently deformed upwardly by the seat-side pad pressing the side portion of the seat cushion. As a result, the present invention can promptly constrain the seated vehicle occupant.

DESCRIPTION OF EMBODIMENTS

Embodiment 1

Figure 1:
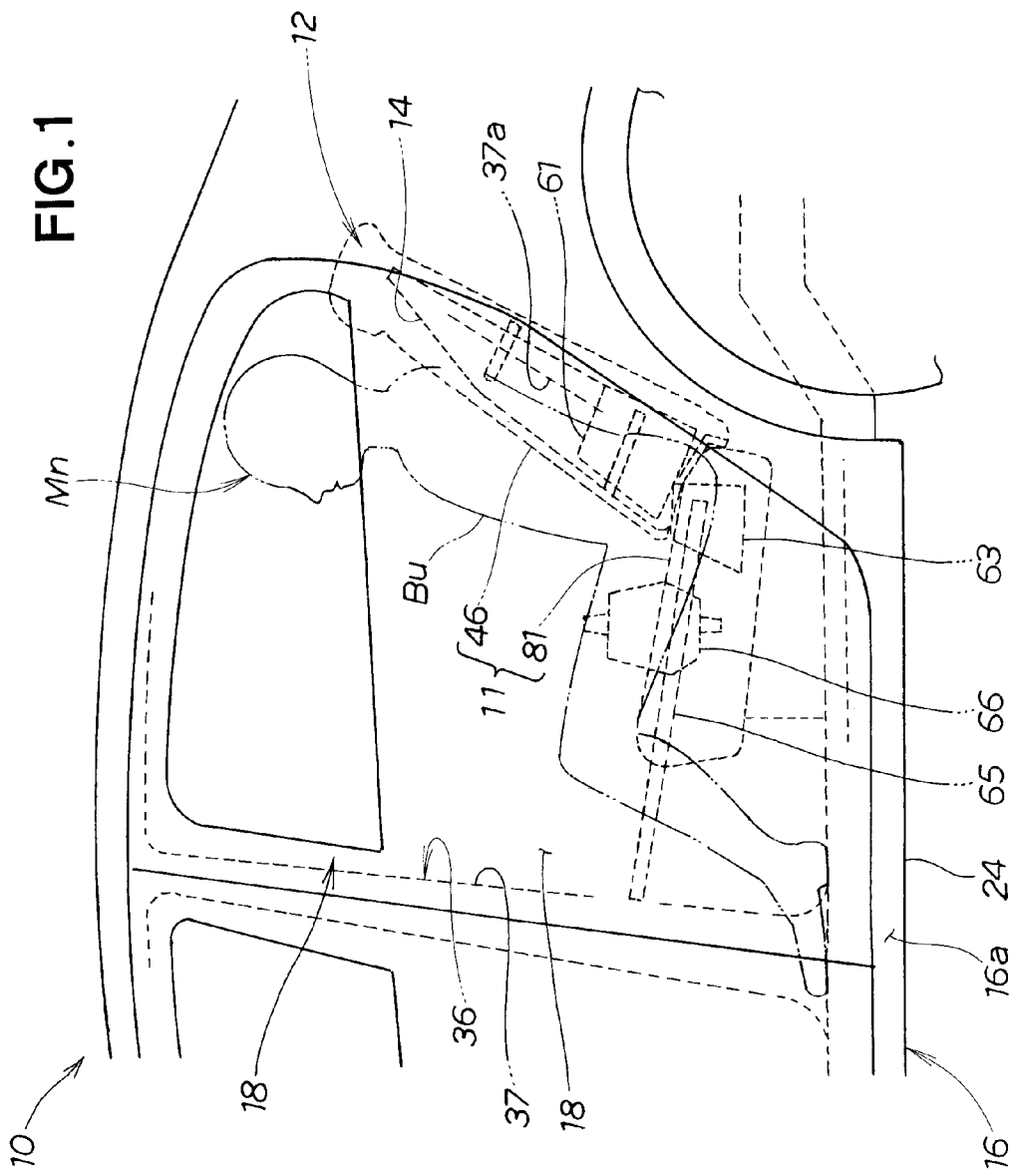
FIG. 1 is a side view showing a rear section of a vehicle provided with a first embodiment of a passenger or vehicle occupant protection device of the present invention.
Figure 2:
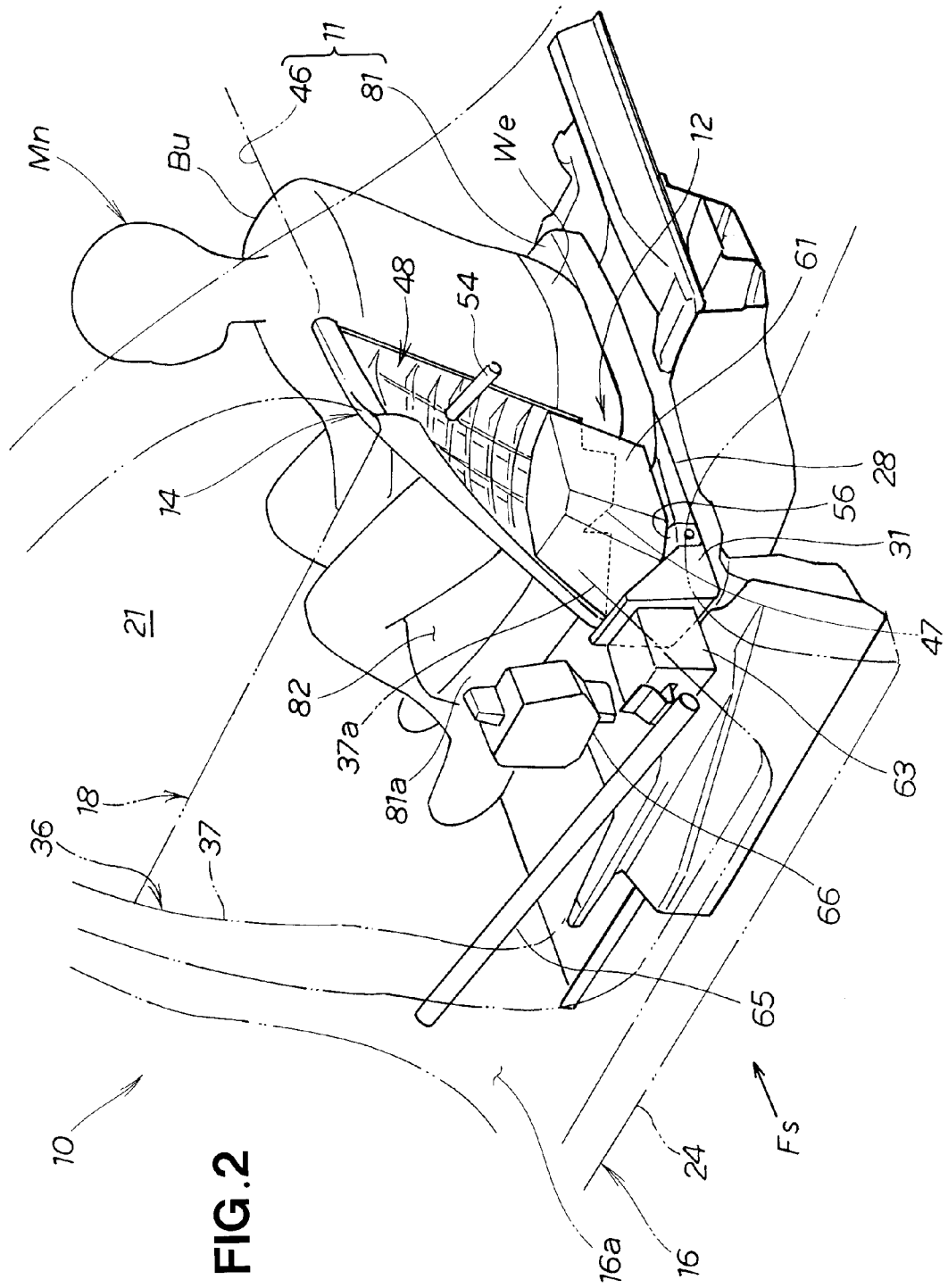
FIG. 2 is a perspective view showing the rear section of the vehicle provided with the vehicle occupant protection device shown in FIG. 1.

First, with reference to FIGS. 1 to 6, a description will be given about a first embodiment of a passenger or vehicle occupant protection device 12 of the present invention. As shown in FIGS. 1 and 2, a vehicle 10, to which the first embodiment is applied, includes two, i.e. left and right, door openings 36 formed in a rear portion of left and right side surfaces 16a of a vehicle body 16 (only the left door opening 36 is shown), a seat 11 disposed in a passenger compartment 21 adjacent to the door openings 36, and the vehicle occupant protection device 12.

The seat 11 is, for example, a rear seat capable of seating three persons and disposed along the door openings 36 and side doors 18. The seat 11 includes a seat cushion 81 and a seat back 46.

The left and right door openings 36 are each disposed to allow a passenger or vehicle occupant Mn to get in and out of the vehicle 10, and they are opened or closed with the corresponding side doors 18 (rear doors 18). Each of the side surfaces 16a of the vehicle body 16 has a peripheral edge 37 defining the door opening 36. When the door opening 36 is closed with the side door 18, a frame (peripheral edge) of the side door 18 overlaps the peripheral edge 37 (flange) of the door opening 36.

Figure 3:
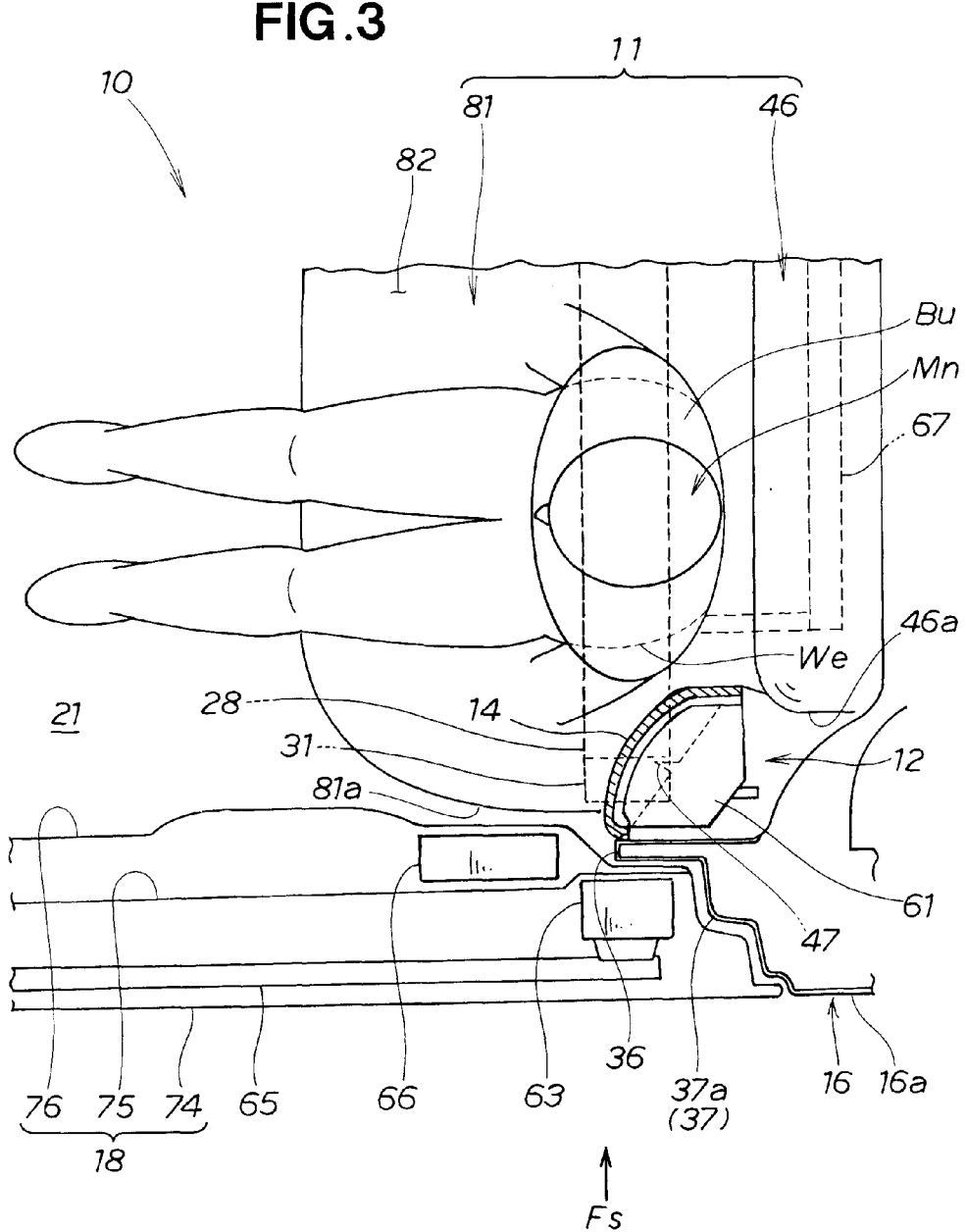
FIG. 3 is a plan view showing the rear section of the vehicle provided with the vehicle occupant protection device shown in FIG. 1.

As shown in FIG. 3, the side door 18 includes an outer panel 74, an inner panel 75, a resin-made door lining 76 covering the inner panel 75, and a door beam 65. The door beam 65 is a member elongated in a front-rear direction of the vehicle 10 for reinforcing the left rear door 18, and it is disposed between the outer panel 74 and the inner panel 75.

As shown in FIGS. 2 and 3, the vehicle body 16 includes a cross member 28 extending in a vehicle width direction under the seat 11, and a gusset portion 31 (abutting member 31) fixed to the opposite ends of the cross member 28. The opposite ends of the cross member 28 are located to face left and right side sills 24 or neighborhoods of the left and right side sills 24. Each of the gusset portions 31 is located close to the corresponding side door 18 with a predetermined gap therefrom.

The vehicle occupant protection device 12 is constructed to protect the vehicle occupant Mn, seated in the seat 11, when impact force, i.e. external force Fs, has acted on the side surface 16a (including the side door 18) from outside in the vehicle width direction. The vehicle occupant protection device 12 includes a side support 14, the cross member 28, the gusset portion 31, a deformation permitting portion 47, a load lessening portion 61, a load transmission portion 63, and an impact absorbing member 66 (door-side pad 66).

The side support 14 is capable of supporting a surface, adjacent to the side door 18, of an upper-half body part Bu of the vehicle occupant Mn seated in the seat 11, and such side supports 14 are provided on left and right side portions 46a (i.e., side portions in the vehicle width direction of the seat back 46). Each of the side supports 14 is a member elongated in a vertical or up-down direction of the vehicle, which is disposed in a vertically-elongated orientation to extend along a rear portion 37a of the peripheral edge 37 defining the door opening 36 in the side surface 16a of the vehicle body 16. The rear portion 37a of the peripheral edge 37 is a rear end portion of the peripheral edge 37 (i.e. rear flange portion of a vertical frame). The side support 14 is arcuately convexly curved toward the front of the vehicle 10.

Figure 4:
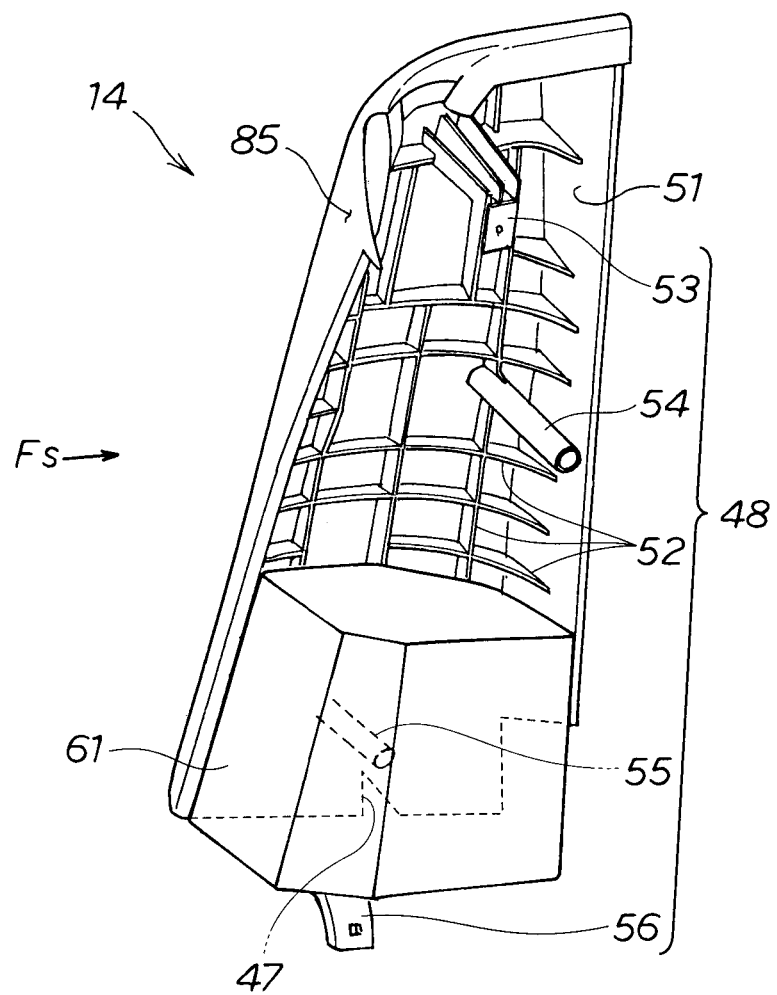
FIG. 4 is a rear perspective view of a side support and a load lessening portion shown in FIG. 2.
Figure 5:
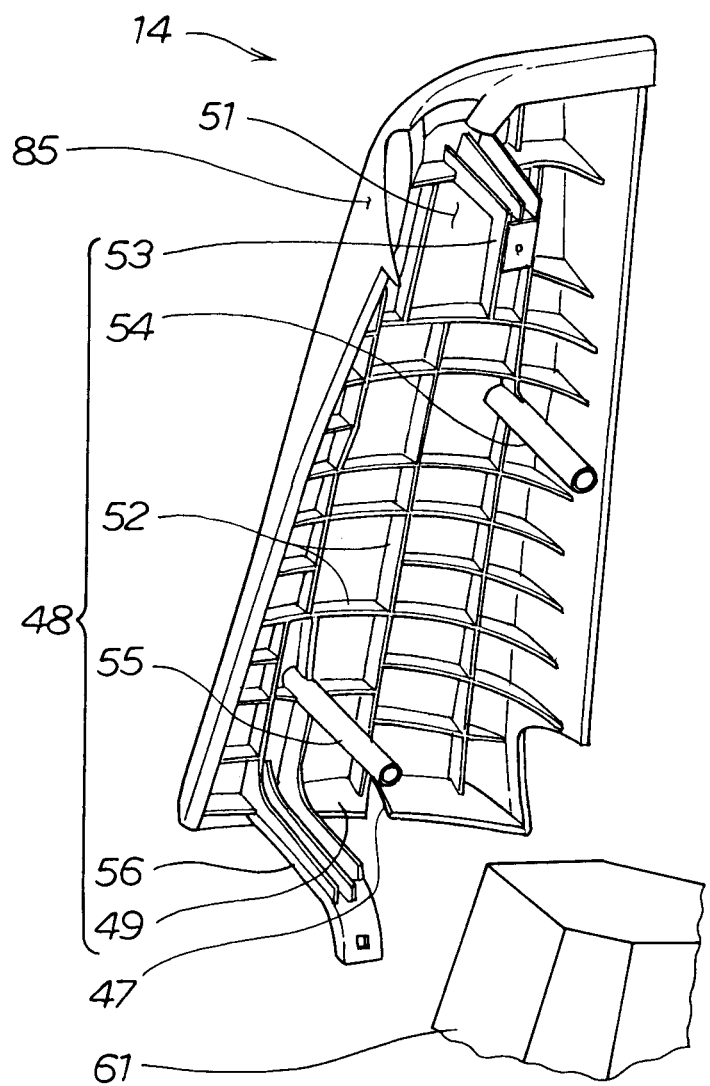
FIG. 5 is an exploded view showing the side support of FIG. 4 with the load lessening portion removed therefrom.

As shown in FIGS. 2, 4 and 5, the side support 14 comprises a base plate 51, a reinforcing member 48 and an outer cover member 85. The base plate 51 and the reinforcing member 48 are integrally formed of a resin material. The outer cover member 85 covers the outer surface of the base plate 51 and is adhesively fixed to the base plate 51.

The base plate 51 is a basic member functioning as a framework of the side support 41, and it has a substantially U sectional shape as viewed from above. The bottom of the U sectional shape faces toward the front of the vehicle 10. The reinforcing member 48 is provided on the back surface of the side support 14 (inner surface of the U sectional shape) for reinforcing the side support 14, and it includes a lower-end rib 49, ribs 52, a first stay 53, a second stay 54, a third stay 55 and a fourth stay 56.

The lower-end rib 49 is a member of a flat plate shape formed to close the lower end of the base plate 51 of the U sectional shape. The ribs 52 are arranged in a lattice structure. The stays 53 to 56 are elongated members sequentially arranged relative to the base plate 51 in order of, from up to down, the first stay 53, second stay 54, third stay 55 and fourth stay 56. The stays 53 to 56 extend from the back surface of the side support 14 toward the rear of the vehicle body 16 in parallel to one another. Each of the stays 53 to 56 has a proximal end located at any of the ribs 52 and has a distal end fixed to the vehicle body 16 by means of a fastener member, such as a bolt. Alternatively, each of the stays 53 to 56 may be fixed to a seat back frame 67 (see FIG. 3). The seat back frame 67 is a member for supporting the seat back on the vehicle body 16.

The deformation permitting portion 47 is a fragile part that is provided in at least a part, i.e. lower-end rib 49, of the reinforcing member 48, and that has a smaller strength against external force Fs than the remaining parts of the reinforcing member 48. More specifically, the deformation permitting portion 47 is in the form of a notch formed in the lower-end rib 49 and having a V shape as viewed in plan. The bottom of the V shape faces toward the front of the vehicle 10. Namely, the deformation permitting portion 47 is provided on the side support 14 and allows the side support 14 to be deformed due to external force Fs (see FIG. 2).

The load lessening portion 61 in the side support 14 is provided on or near the part 49 (lower-end rib 49) of the side support 14 that has the deformation permitting portion 47 provided therein. The load lessening portion 61 is located on a lower portion of the base plate 51 so that it is supported, for example, by the lower-end rib 49, third stay 55 and fourth stay 56. The load lessening portion 61 is in the form of a polygonal columnar member of a resin material; for example, the load lessening portion 61 is a foamed member formed by foaming resin, such as urethane resin, or a hollow member of a bag or box shape.

As shown in FIGS. 1, 2 and 3, the load transmission portion 63 is provided in the side door 18 and fixedly connected to the door beam 65. The load transmission portion 63 is a member capable of transmitting external force Fs from the side door 18 to the vehicle body 16. Namely, the load transmission portion 63 can transmit external force Fs from the side door 18 to the peripheral edge 37 of the door opening 36. The end surface (outer surface in the vehicle width direction) of the gusset portion 31 is opposed to the load transmission portion 63. Thus, the gusset portion 31 is capable of transmitting external force Fs from the load transmission portion 63 to the cross member 28.

As further shown in FIGS. 1, 2 and 3, the impact absorbing member 66 is provided in the side door 18 and disposed to overlap the door beam 65 as the vehicle 10 is viewed from a side thereof. More specifically, the impact absorbing member 66 is, for example, in the form of a pad formed of urethane resin and is disposed between the inner panel 75 and the door lining 76.

As shown in FIGS. 2 and 3, the deformation permitting portion 47 is disposed above the gusset portion 31 and spaced from the load transmission portion 63 in the front-rear direction or up-down direction of the vehicle 10. Further, the deformation permitting portion 47 is disposed at a position such that it does not interfere with the impact absorbing member 66 that moves toward the seat 11 in response to deformation of the side door 18. As the vehicle 10 is viewed from the side, a lower part of the load lessening portion 61 overlaps the gusset portion 31.

The following describe behavior of the first embodiment.

As shown in FIG. 3, the side support 14 is disposed along the rear portion 37a of the peripheral edge 37 that defines the door opening 36 provided in the side surface 16a of the vehicle body 16, and it includes the deformation permitting portion 47 that allows the side support 14 to be deformed in response to external force Fs greater than the predetermined intensity acting on the side surface 16a of the vehicle body 16.

Figure 6:
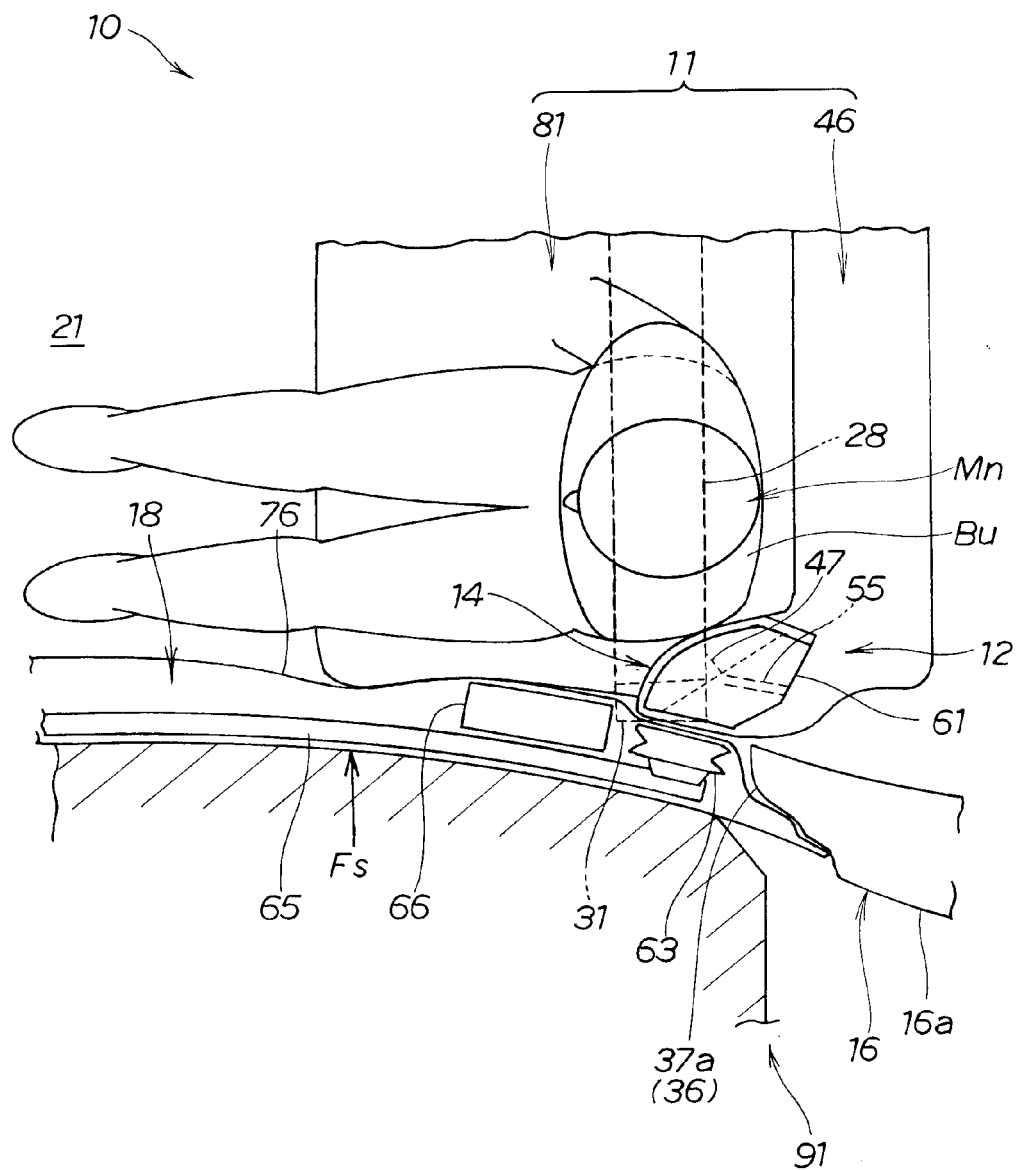
FIG. 6 is a view explanatory of behavior of the vehicle occupant protection device shown in FIG. 3.

When another vehicle 91 has collided against the side surface 16a (including the side door 18) of the vehicle body 16, as shown for example in FIG. 6, the vehicle body 16 and the side door 18 deform toward the interior of the passenger compartment 21 to push the side support 14. Namely, impact force Fs (external force Fs) that would collapse the side support 14 in the vehicle width direction acts on the side support 14. By being subjected to external force Fs greater than the predetermined intensity, the side support 14 having a U sectional shape as viewed in plan deforms in the vehicle width direction, starting at the deformation permitting portion 47 in the form of a notch having a V shape as viewed in plan. As a consequence, the side support 14 absorbs the external force Fs while deforming. Because the load lessening portion 61 too deforms to absorb the external force Fs while the side support 14 is deforming, the instant embodiment can absorb the impact with an increased efficiency.

As the vehicle body 16 and the side door 18 further deform toward the interior of the passenger compartment 21, the load transmission portion 63 is displaced or moved toward the seat 11 together with the door beam 65 and then hits the gusset portion 31. Thus, the external force Fs is transmitted from the load transmission portion 63 to the cross member 28 via the gusset portion 31. If the external force Fs is great, the gusset portion 31 and the cross member 28 deform in the vehicle width direction to absorb the external force Fs.

In this case, the load lessening portion 61 does not interfere with the load transmission portion 63 and impact absorbing member 66. Thus, the external force Fs is first transmitted from the load transmission portion 63 to the cross member 28 via the gusset portion 31. As a consequence, the cross member 28 is deformed. Then, the cross member 28 absorbs the external force Fs in conjunction with the load lessening portion 61.

As the vehicle body 16 and the side door 18 deform toward the interior of the passenger compartment 21, the door beam 65 deforms to displace the impact absorbing member 66 toward the seat 11. Because the impact absorbing member 66 can be displaced (or moved) without interfering with the load lessening portion 61 and touches the vehicle occupant Mn via the door lining 76, the instant embodiment can lessen impact on the loins of the vehicle occupant Mn.

Namely, when external force Fs greater than the predetermined intensity has acted on the side surface 16*a*, in the width direction, of the vehicle 10, i.e. when a so-called lateral collision has occurred, the side support 14 itself deforms, so that the external force Fs can be sufficiently absorbed. In this way, the instant embodiment can even further enhance the performance for protecting the vehicle occupant Mn seated in the seat 11.

Further, the deformation permitting portion 47 is provided in at least the part 49 of the reinforcing member 48 integrally formed on the side support 14. Further, the deformation permitting portion 47 is a fragile part having a smaller strength against external force Fs than the remaining part of the reinforcing member 48. In a normal state where no external force Fs is acting on the side support, the deformation permitting portion 47 does not deform. Thus, the vehicular occupant Mn in the seated position can be prevented from inclining toward the side door 18, by the side support 14 maintaining its normal-state shape without deformation. Namely, the side support 14 performs the vehicle occupant protection function. On the other hand, when great external force Fs has acted on the side support 14 from outside in the vehicle width direction, the deformation permitting portion 47 deforms first, so that the side support 14 deforms at appropriate timing, starting at the deformation permitting portion 47, to thereby absorb the external force Fs; namely, the side support 14 performs the vehicle occupant protection function. In this way, the instant embodiment can perform both the vehicle occupant protection function during the normal state and the vehicle occupant protection function during an emergency.

Furthermore, the side support 14 includes, on the part 49 having the deformation permitting portion 47 provided therein or near the part 49, the load lessening portion 61 that is in the form of a foamed member or a hollow member. Thus, the side support 14 having been subjected to external force Fs starts to deform while simultaneously deforming the load lessening portion 61. Namely, in the instant embodiment, a characteristic with which external force is absorbed by the side support 14, is a composite characteristic. Thus, the composite characteristic with which external force is absorbed by the side support 14 and load lessening portion 61 can be optimally adjusted in advance by quality of material, shape and size of the foamed member or hollow member, constituting the load lessening portion 61, being set appropriately.

Furthermore, in the instant embodiment, the deformation permitting portion 47 is spaced, in the front-rear direction or up-down direction of the vehicle 10, from the load transmission portion 63 capable of transmitting external force Fs from the side door 18 to the vehicle body 16. Thus, when the external force Fs is transmitted from the side door 18 to the vehicle body 16 via the load transmission portion 63, the external force Fs would be less likely to be transmitted directly to the deformation permitting portion 47. Thus, when the side door 18, having been subjected to the external force Fs, and the vehicle body 16 have deformed toward the interior of the passenger compartment 21, the deformation permitting portion 47 can avoid being directly subjected to the external force, so that deformation of the side support 14 can be restrained.

Further, when subjected to the external force Fs, a deformation amount of a portion of the side door 18 reinforced by the door beam 65 is significantly small as compared to the other portions of the side door 18. Further, the impact absorbing member 66 is not only disposed to overlap the door beam 65 but also connected to the door beam 65, and the impact absorbing member 66 is displaced or moved toward the seat 11 as the side door 18, having been subjected to the external force Fs, deforms toward the interior of the passenger compartment 21. At that time, an amount of the deformation, toward the interior of the passenger compartment 21, of the impact absorbing member 66 is small. Thus, the impact absorbing member 66 can appropriately hold or constrain the seated vehicle occupant Mn by relatively lightly contacting the vehicle occupant Mn. Furthermore, the deformation permitting portion 47 is located so as to not interfere with the impact absorbing member 66. Thus, when the impact absorbing member 66, having been subjected to the external force Fs, has been displaced (moved) toward the sheet seat 11, the impact absorbing member 66 and the deformation permitting portion 47 do not influence each other. Thus, the impact absorbing member 66 and the deformation permitting portion 47 can sufficiently perform their respective functions.

Further, as shown in FIGS. 2 and 5, the stays 53 to 56 for fixing the side support 14 to the vehicle body 16 or seat back frame 67 (see FIG. 3) extend in the front-rear direction of the vehicle 10. Namely, the extending direction of the stays 53 to 56 is generally orthogonal to a direction in which external force Fs acts on the side surface 16*a* of the vehicle 10. Thus, when the side door 18, having been subjected to external force Fs, and the vehicle body 16 deform toward the interior of the passenger compartment 21, the stays 53 to 56 do not disturb the deformation of the side door 18 and vehicle body 16. Thus, the external force Fs acts on the side support 14 in response to the deformation of the side door 18 and vehicle body 16. The side support 14 can absorb the external force Fs by deforming at appropriate timing and in an appropriate manner.

Further, as shown in FIG. 3, the side support 14 is arcuately convexly curved toward the front of the vehicle 10, and thus, the side support 14 would easily deform when subjected to external force Fs applied in the vehicle width direction.

Further, as shown in FIG. 2, the cross member 28 extends in the vehicle width direction and is located near the load transmission portion 63, and the gusset portion 31 transmits external force Fs from the load transmission portion 63 to the cross member 28. Thus, the side door 18, having deformed due to the external force Fs toward the interior of the passenger compartment 21, can be caught by the cross member 28 via the gusset portion 31. As a consequence, the instant embodiment can reduce an amount of deformation of the side door 18. Further, the deformation permitting portion 47 is located above the gusset portion 31, and thus, once the amount of deformation of the side door 18 further increases, the external force Fs acts on the side support 14 by way of the side door 18. The side support 14 can absorb the external force Fs by deforming, from the deformation permitting portion 47 on, at appropriate timing.

Second Embodiment

Figure 7:
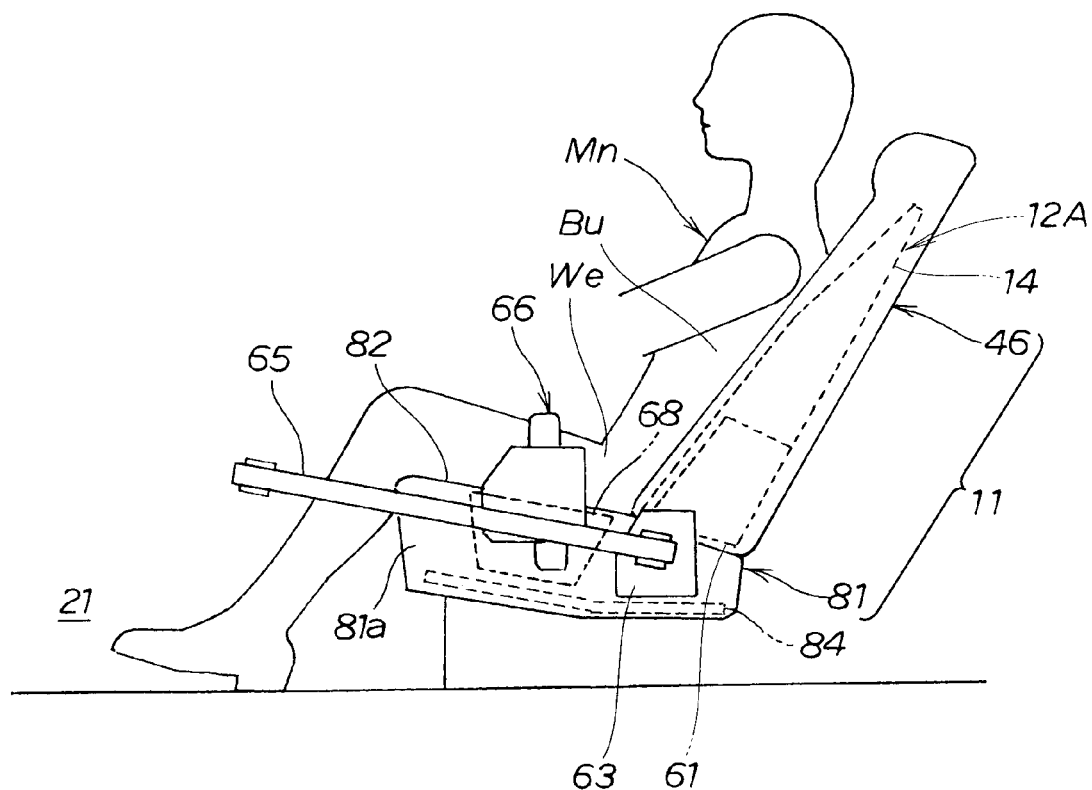
FIG. 7 is a side view showing a second embodiment of the vehicle occupant protection device together with a seat of the vehicle.
Figure 8:
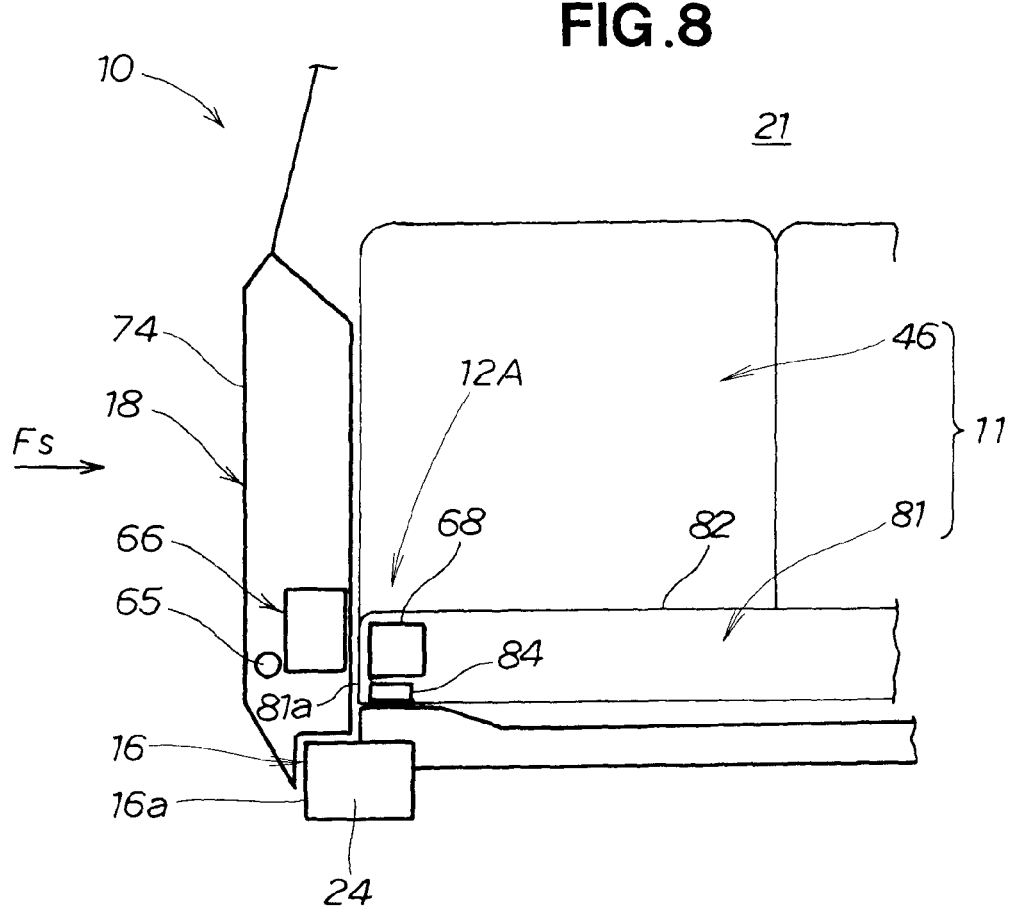
FIG. 8 is a rear view of the second embodiment of the vehicle occupant protection device and the seat shown in FIG. 7.

Next, with reference to FIGS. 7 and 8, a description will be given about a second embodiment of the vehicle occupant protection device 12A. The second embodiment of the vehicle occupant protection device 12A is characterized by inclusion of a seat-side pad 68 in addition to the impact absorbing member 66 (door-side pad 66). Other elements and components in the second embodiment are the same as in the first embodiment of FIGS. 1 to 6 and thus will not be described here to avoid unnecessary duplication.

The seat-side pad 68 is formed of a material softer than a material of the door-side pad 66 but harder than a material of a seating surface 82 of the seat cushion 81, and this seat-side pad 68 is provided in a side portion 81a of the seat cushion 81. As the vehicle 10 is viewed from its side, the seat-side pad 68 is disposed to not overlap a seat frame 84 (FIG. 7). The seat frame 84 is a member for supporting the seat cushion 81 on the vehicle body 16.

The door-side pad 66 is capable of transmitting eternal force Fs from the side door 18 to the seat-side pad 68, and it is disposed to overlap the seat-side pad 68 as the vehicle 10 is viewed from the side. The door-side pad 66, on the other hand, is disposed to overlap the door beam 65 but to not overlap the load transmission portion 63, as the vehicle 10 is viewed from the side.

The second embodiment behaves as follows.

External force Fs having acted on the side door 18 is transmitted from the door-side pad 66 to the seat-side pad 68. Namely, the external force Fs is transmitted to the seat cushion 81 while being attenuated by the door-side pad 66 and seat-side pad 68. Because the seat-side pad 68 is formed of the material harder than the material of the seating surface 82 of the seat cushion 81, the seat-side pad 68, having received the external force Fs, presses the side portion 81a of the seat cushion 81 toward the center of the vehicle width so that the seating surface 82 is deformed upwardly. The thus upwardly-deformed seating surface 82 can produce force that promptly constrains the seated vehicle occupant Mn to thereby move the loins We of the vehicle occupant Mn toward the center of the passenger compartment.

Further, as the vehicle 10 is viewed from the side, the door-side pad 66 overlaps the door beam 65, but does not overlap the load transmission portion 63. Thus, the door-side pad 66 and the load transmission portion 63 do not influence each other. In this way, the impact absorbing member 66 and the load transmission portion 63 can sufficiently perform their respective functions.

Further, the seat-side pad 68 is formed of the material softer than the material of the door-side pad 66 as noted above. Thus, as the door-side pad 66, having received the external force Fs, presses the seat-side pad 68, the seat-side pad 68 deforms (collapses) by a great amount as compared to the amount of deformation (collapsing), in the vehicle width direction, of the door-side pad 66. Thus, as the side door 18, having received the external force Fs, is displaced toward (i.e., gets closer to) the side portion 81a, the seat-side pad 68 pressed by the door-side pad 66 absorbs the external force Ns by collapsing a great amount. Because the seat-side pad 68 itself deforms greatly, it would not be displaced in such a manner as to greatly bite into the side portion 81a of the seat cushion 81. As a consequence, the external force Fs that is transmitted to the vehicle occupant Mn seated in the seat 11, particularly the loins We of the vehicle occupant Mn, can be sufficiently absorbed before the side door 18 is displaced greatly toward the side portion 81a of the seat cushion 81.

Further, as the vehicle 10 is viewed from the side, the seat-side pad 68 is disposed to not overlap the seat frame 84 that supports the seat cushion 81 on the vehicle body 16. Thus, the external force Fs acting on the seating surface 82 from the seat-side pad 68 is not impeded by the seat frame 84. Thus, the seating surface 82 can be efficiently deformed upwardly by the seat-side pad 68 pressing the side portion 81a of the seat cushion 81. As a result, the second embodiment can promptly constrain the seated vehicle occupant Mn.

Third Embodiment

Figure 9:
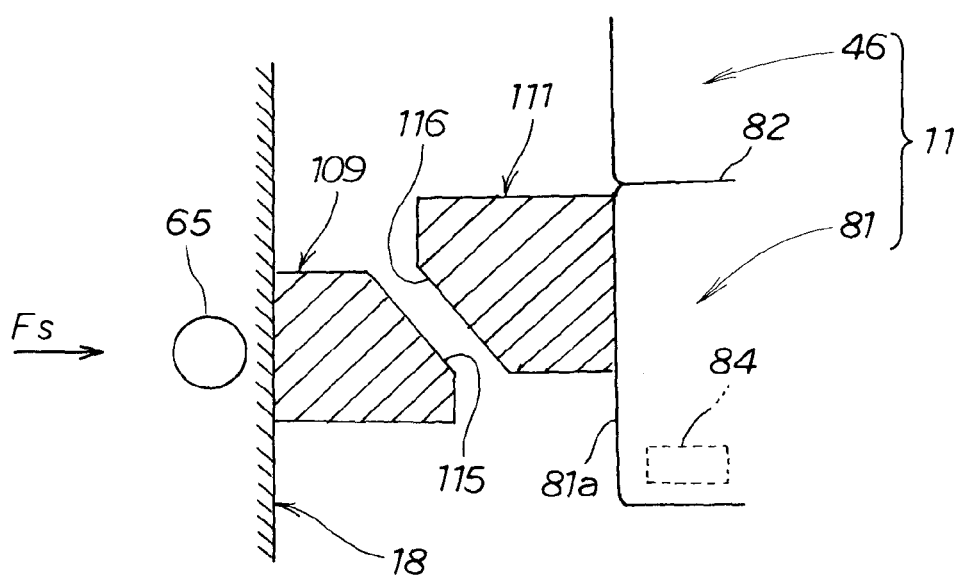
FIG. 9 is a rear view showing relationship between a door-side pad and a seat-side pad in a third embodiment of the vehicle occupant protection device.

Next, with reference to FIG. 9, a description will be given about a third embodiment of the vehicle occupant protection device 100. The third embodiment of the vehicle occupant protection device 100 is characterized by a combination of a door-side pad 109 and seat-side pad 111. The door-side pad 109 of FIG. 9 is substantially the same in basic construction as the door-side pad 66 of FIGS. 7 and 8, and the seat-side pad 111 of FIG. 9 is substantially the same in basic construction as the seat-side pad 68 of FIGS. 7 and 8. The seat-side pad 111 is disposed at a considerable distance from the seat frame 84.

The door-side pad 109 has a pressing surface 115 that is capable of pressing a pressed surface 116 of the seat-side pad 111. At least one of the pressing surface (guiding surface) 115 and pressed surface (guided surface) 116 is formed as a guide surface, i.e. slanting surface, that transmits external force Fs from the pressing surface 115 to the pressed surface 116 to thereby guide the seat-side pad 111 in a direction different from the direction where the external force Fs is transmitted. Namely, at least one of the pressing surface 115 and the pressed surface 116 is a guide surface that prompts the seat-side pad 111 to move in a predetermined direction.

As the door-side pad 109, having received the external force Fs, presses the pressed surface 116 of the seat-side pad 111, the seat-side pad 111 moves in a direction different from the transmitting direction of the external force Fs, i.e., in the front-rear direction or up-down direction of the vehicle 10. As a result, the external force Fs transmitted from the seat-side pad 111 to the side portion 81a of the seat cushion 81 can be dispersed not only in the vehicle width direction but also in the front-rear direction or up-down direction of the vehicle 10. The other structural elements in the third embodiment are the same as in the first embodiment shown in FIGS. 1 to 6 and the second embodiment shown in FIGS. 7 and 8.

Note that the vehicle occupant protection devices 12, 12A and 100 of the present invention are also applicable to a third one of three rows of seats arranged in the front-rear direction.

INDUSTRIAL APPLICABILITY

The vehicle occupant protection device 12, 12A and 100 of the present invention are well suited for protecting a passenger or vehicle occupant Mn seated in a vehicle seat 11.

LEGEND 10 vehicle
11 seat
12, 12A passenger protection device
14 side port
16 vehicle body
16a side surface
18 side door
21 passenger compartment
28 cross member
31 gusset portion
36 door opening
37 peripheral edge
37a rear portion
46 seat back
46a side portion 47 deformation permitting portion
48 reinforcing member
49 part of reinforcing member (lower-end rib, or part having deformation permitting portion)
53, 54, 55, 56 stay
61 load lessening portion
63 load transmission portion
65 door beam
66 impact absorbing member (door-side pad)
67 seat back frame
68 seat-side pad
81 seat cushion
81a side portion
82 seating surface
84 seat frame
100 passenger protection device
109 door-side pad
111 seat-side pad
115 pressing surface
116 pressed surface
Bu upper-half part of body
Fs external force
Mn passenger
We loins

The invention claimed is:

1. A passenger protection device in a vehicle including a door opening provided in a side surface of a vehicle body and openable and closable with a side door, and a seat disposed in a passenger compartment near the door opening, the passenger protection device provided for protecting a passenger, seated in the seat, when external force acts on the side surface of the vehicle body,
wherein the passenger protection device comprises a side support provided on a side portion of a seat back of the seat and configured to support a surface, adjacent to the side door, of an upper half part of a body of the passenger seated in the seat,
wherein the side support is disposed along a rear portion of a peripheral edge defining the door opening, the side support comprising a base plate as a framework of the side support, and a reinforcing member integrally formed on a back surface of the base plate for reinforcing the side support, the side support including a deformation permitting portion which permits the side support to be deformed by an external force that is greater than a predetermined intensity,
wherein the deformation permitting portion is provided by forming at least a part of the reinforcing member as a fragile part having a smaller strength against the external force than a remaining part of the reinforcing member,
wherein the reinforcing member comprises ribs arranged in a lattice structure including a plurality of horizontal ribs and a plurality of vertical ribs, and the deformation permitting portion is provided in one of the horizontal ribs and is in the form of a notch; and
wherein the passenger protection device is configured and arranged such that when the external force which is greater than the predetermined intensity acts on the side support in a vehicle-width direction, the side support deforms in the vehicle width direction beginning at the notch as the deformation permitting portion to thereby absorb the external force.

2. The passenger protection device according to claim 1, wherein the side support further includes, on the part having the deformation permitting portion provided therein or near the part, a load lessening portion that is in a form of a foamed member or a hollow member.

3. The passenger protection device according to claim 1, further comprising a load transmission portion provided in the side door, the load transmission portion being configured to transmit the external force from the side door to the vehicle body, the deformation permitting portion being spaced from the load transmission portion in a front-rear direction or up-down direction of the vehicle.

4. The passenger protection device according to claim 3, further comprising an impact absorbing member provided in the side door,
wherein, as the vehicle is viewed from a side thereof, the impact absorbing member is disposed to overlap a door beam that is elongated in the front-rear direction for reinforcing the side door, the door beam being fixedly connected to the load transmission portion, and
the deformation permitting portion is disposed to not interfere with the impact absorbing member that is moved toward the seat in response to deformation of the side door.

5. The passenger protection device according to claim 1, wherein the side support includes a stay fixed to one of the vehicle body and a seat back frame for supporting the seat back on the vehicle body, the stay extending in a front-rear direction of the vehicle.

6. The passenger protection device according to claim 1, wherein the side support has a shape convexly curved toward a front of the vehicle.

7. The passenger protection device according to claim 3, further comprising a cross member and a gusset portion mounted on the vehicle body,
wherein the cross member extends in a width direction of the vehicle and is disposed near the load transmission portion,
the gusset portion is constructed to be capable of transmitting the external force from the load transmission portion to the cross member, and
the deformation permitting portion is disposed above the gusset portion.

8. The passenger protection device according to claim 1, further comprising a seat-side pad and a door-side pad,
wherein the seat-side pad is formed of a material harder than a material of a seating surface of a seat cushion of the seat and provided in a side portion of the seat cushion, and
the door-side pad is provided in the side door in such a manner that the external force can be transmitted from the side door to the seat-side pad, the door-side pad being disposed to overlap the seat-side pad as the vehicle is viewed from a side thereof.

9. The passenger protection device according to claim 8, further comprising a load transmission portion provided in the side door in such a manner that the external force can be transmitted from the side door to the edge of the door opening,
wherein, as the vehicle is viewed from the side thereof, the door-side pad is disposed to overlap a door beam elongated in a front-rear direction of the vehicle for reinforcing the side door, but to not overlap the load transmission portion.

10. The passenger protection device according to claim 8, wherein the material of the seat-side pad is softer than a material of the door-side pad.

11. The passenger protection device according to claim 8, wherein the door-side pad has a pressing surface capable of pressing a pressed surface of the seat-side pad, and
at least one of the pressing surface and the pressed surface is formed as a guide surface capable of guiding the seat-side pad in a direction different from a transmitting direction of the external force by transmitting the external force from the pressing surface to the pressed surface.

12. The passenger protection device according to claim 8, wherein, as the vehicle is viewed from the side thereof, the seat-side pad is disposed to not overlap a seat frame for supporting the seat cushion on the vehicle body.

13. The passenger protection device according to claim 1, wherein the side support extends along substantially a full height of the seat back.

14. The passenger protection device according to claim 1, wherein a bottom surface of the side support is disposed at substantially the same level as an upper surface of a seat cushion of the seat.

15. The passenger protection device according to claim 1, wherein the deformation of the side support via the deformation permitting portion helps absorb the external force.

16. The passenger protection device according to claim 1, wherein the deformation permitting portion is disposed near a lower end of the reinforcing member.

17. The passenger protection device according to claim 1, wherein said one of the horizontal ribs in which the deformation permitting portion in the form of a notch is provided comprises a lower-end rib provided at a lower end of the base plate and having a flat plate shape.

18. The passenger protection device according to claim 1, wherein the base plate and the reinforcing member are integral with each other and formed from a plastic resin material.

19. A passenger protection device in a vehicle including a door opening provided in a side surface of a vehicle body and openable and closable with a side door, a seat disposed in a passenger compartment near the door opening, the passenger protection device provided for protecting a passenger, seated in the seat, when external force acts on the side surface of the vehicle body, wherein the passenger protecting device comprises a side support provided inside of the passenger compartment of the vehicle immediately adjacent a side portion of a seat back of the seat, the side support being configured to support a surface, adjacent to the side door that supports an upper half of a body of the passenger, wherein the side support is disposed along a rear portion of a peripheral edge defining the door opening, the side support comprising a base plate as a framework of the side support, and a reinforcing member integrally formed on a back surface of the base plate for reinforcing the side support, the base plate and the reinforcing member being integral with each other and formed from a plastic resin material, the side support including a deformation permitting portion which permits the side support to be deformed by an external force that is greater than a predetermined intensity, wherein the deformation permitting portion is provided by forming at least a part of the plastic resin reinforcing member as a fragile part having a smaller strength against the external force than a remaining part of the reinforcing member, and wherein the reinforcing member comprises ribs arranged in a lattice structure including a plurality of horizontal ribs and a plurality of vertical ribs, and the deformation permitting portion is provided in one of the horizontal ribs and is in the form of a notch.

20. The passenger protection device according to claim 19, wherein said one of the horizontal ribs in which the deformation permitting portion in the form of a notch is provided comprises a lower-end rib provided at a lower end of the base plate and having a flat plate shape.

* * * * *